Oct. 16, 1951     L. E. BOWMAN     2,571,191
POWER CULTIVATOR

Filed Oct. 4, 1946     3 Sheets-Sheet 1

INVENTOR.
LAWRENCE E. BOWMAN,
BY: Harold B. Hood.
ATTORNEY.

Oct. 16, 1951 — L. E. BOWMAN — 2,571,191
POWER CULTIVATOR
Filed Oct. 4, 1946 — 3 Sheets-Sheet 2
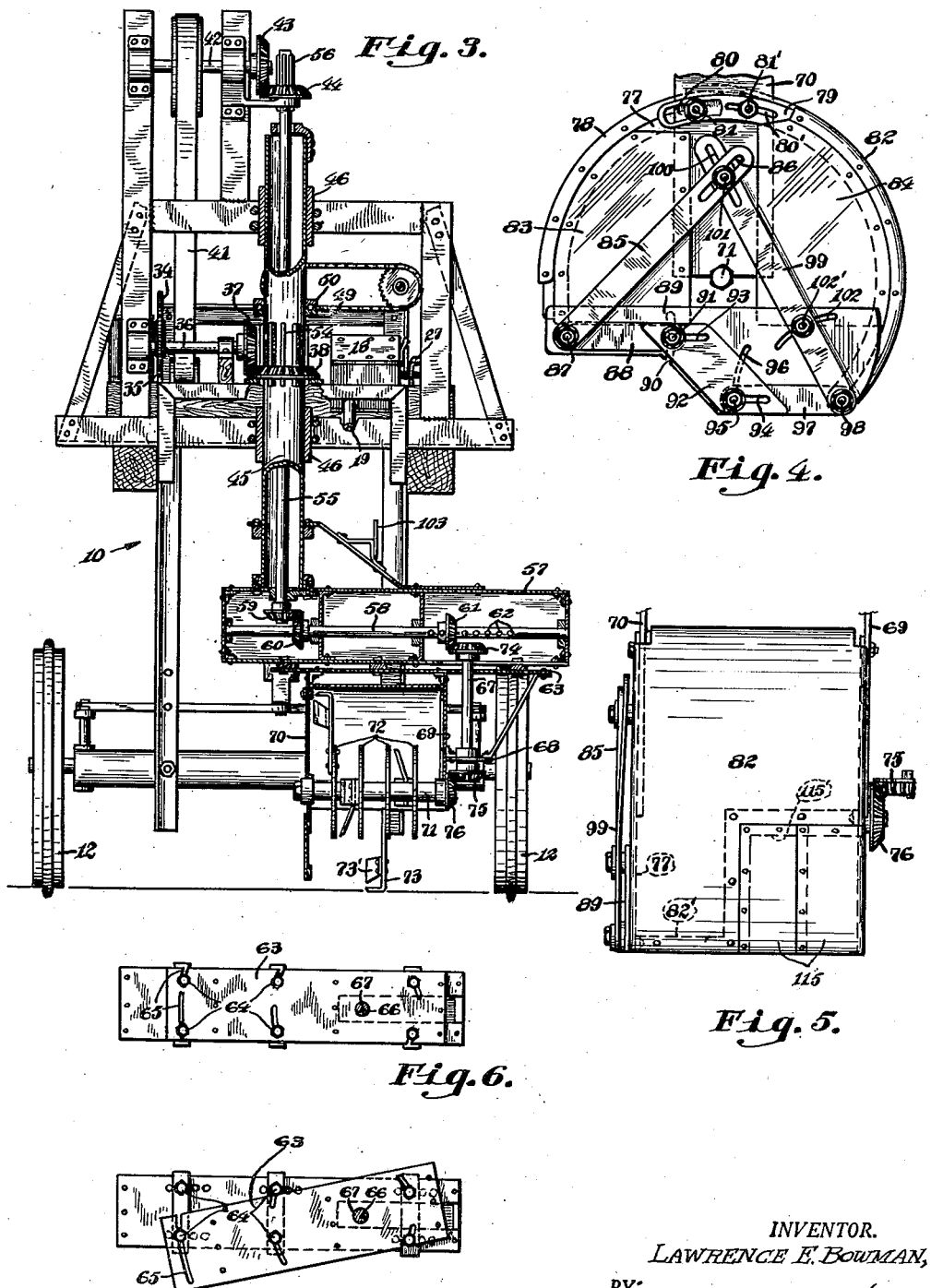
INVENTOR.
LAWRENCE E. BOWMAN,
BY: Harold B. Hood.
ATTORNEY.

Oct. 16, 1951 — L. E. BOWMAN — 2,571,191
POWER CULTIVATOR

Filed Oct. 4, 1946 — 3 Sheets-Sheet 3

INVENTOR.
LAWRENCE E. BOWMAN.
BY: Harold B. Hood.
ATTORNEY.

Patented Oct. 16, 1951

2,571,191

UNITED STATES PATENT OFFICE 2,571,191

POWER CULTIVATOR

Lawrence E. Bowman, Greenfield, Ind.

Application October 4, 1946, Serial No. 701,269

17 Claims. (Cl. 97—43)

The present invention relates to a cultivator, and the primary object of the invention is to provide a machine which can be centered over a plant or a hill of plants and which will then operate to scarify and/or chop and stir the earth in an annular path completely surrounding the plant or hill, without disturbing the region over which the machine is centered. A further object of the invention is to provide, in such a machine, novel mechanism for accomplishing the above object, novel drive means for the scarifying means and for rotating the scarifying means about the plant or hill, means for adjusting the level at which the scarifying means operates, and means for stopping rotation of the scarifying means after one full revolution has been completed. A still further object of the invention is to provide an automotive machine of the character described including a prime mover, a drive train including a clutch connecting the prime mover to the traction wheels of the machine, and a second drive train including a clutch connecting the prime mover to the scarifier rotating means, and control means whereby engagement of the latter clutch will be accompanied by disengagement of the former clutch, and whereby, upon completion of one full revolution of the scarifying means, the former clutch will be automatically engaged and the latter clutch will be automatically disengaged.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 3 is a transverse section through the machine taken on a plane immediately behind the scarifier rotating means and looking toward the front of the machine;

Fig. 4 is an enlarged side elevation of a dirt guard;

Fig. 5 is a rear elevation thereof;

Figs. 6 and 7 are bottom plan views of the scarifier supporting means shown in two positions of adjustment;

Figure 1:
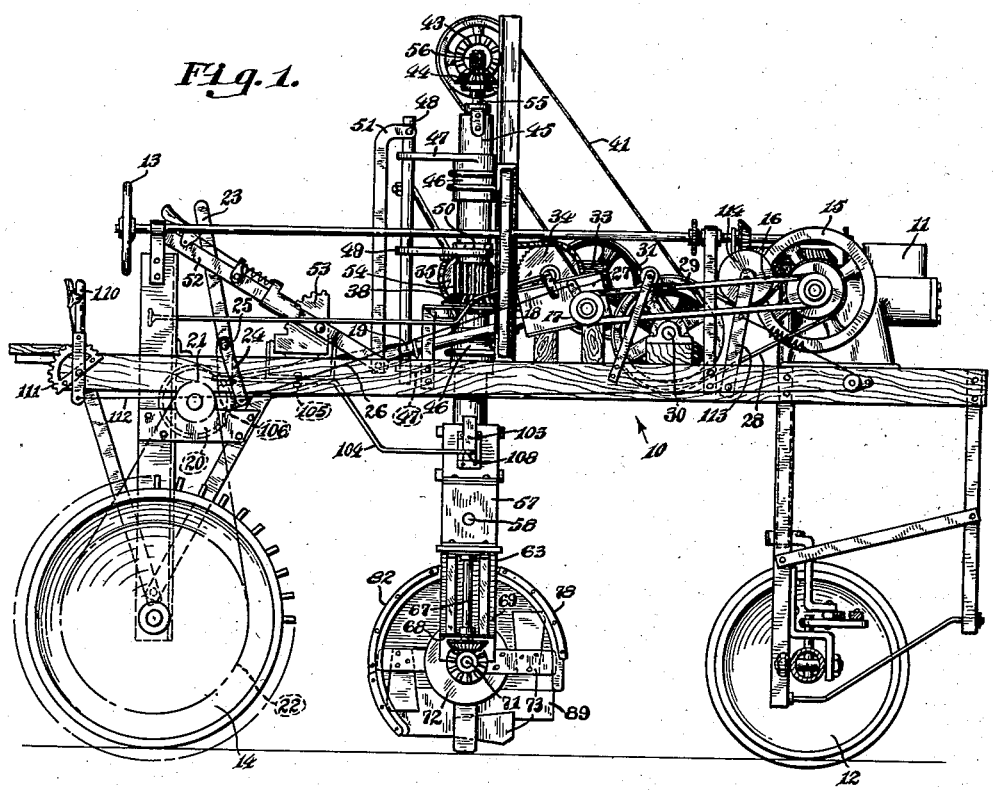
Fig. 1 is a side elevation of a machine constructed in accordance with my invention.

Referring more particularly to the drawings, it will be seen that I have illustrated a machine comprising a main frame indicated generally by the reference numeral 10, upon which is mounted a prime mover 11 which may preferably be a gasoline or diesel engine. Supporting front ground wheels 12 may be dirigibly controlled by a wheel 13 or the like; and traction wheels 14 support the rear end of the main frame.

A fly wheel 15, driven by the engine 11, drives, through a belt 16, a clutch mechanism 17 having a return spring 17' and installed in advance of a gear box 18, which may be a selective speed transmission; and a propeller shaft 19 leads from said gear box to a differential 20 the opposite ends of which drive sprockets 21 which may be chain connected to sprockets 22 on the traction wheels 14. A lever 23 fixed to a transverse rock shaft 25 controls a lever 24, likewise fixed to said shaft, and connected by a cable 26 to a control lever 27 operable to disengage the clutch 17 when the lever 23 is rocked in a clockwise direction as viewed in Fig. 1.

A second belt 28 drives from the fly wheel 15 to a pulley 29 mounted on a transverse shaft 30; and said shaft drives, through a belt 31, a shaft 32 of a clutch mechanism 33 including a return spring 33'. A sprocket 34 driven by said clutch mechanism is chain connected to a sprocket 35 on a shaft 36 (Fig. 3) suitably journalled in bearings on the frame 10. Said shaft 36 carries a beveled gear 37 meshing with a beveled gear 38 suitably supported upon the frame 10 for rotation about a vertical axis. A lever 39 (Fig. 2), fixed to the shaft 25 controls the clutch mechanism 33 through the medium of a cable 40, the construction being such that said clutch 33 is engaged when the lever 23 is rocked in a clockwise direction as viewed in Fig. 1. Preferably, the clutch mechanism 33 will include conventional braking means (not shown) engaged when the clutch is disengaged, to hold the shaft 36 and its associated parts against accidental movement so long as such clutch is disengaged.

The shaft 30 further drives, through a belt 41, a shaft 42 (Figs. 2 and 3) suitably journalled on the frame 10 and carrying a beveled gear 43 meshing with a beveled gear 44 suitably mounted upon the frame 10 for rotation about a vertical axis, said gear 44 being coaxial with said gear 38.

A tubular shaft 45 is journalled in a pair of aligned bearing elements 46, 46 fixed to the frame 10 at vertically spaced points; said bearings being provided with a pair of spaced, rearwardly projecting brackets 47 in which is received a rod 48 mounted for reciprocation. Intermediate its ends, there is fixed to said rod a forwardly projecting arm 49 upon the upper surface of which bears a ring 50 fixed to the tubular shaft 45 (Figs. 1 and 3). Preferably, antifriction bearing means will be interposed between the arm 49 and the ring 50. A link 51 is pivotally connected with the upper end of the rod 48 and with one arm of a lever 52 associated with a standard retention rack 53. It will thus be seen that the tubular shaft 45 is supported upon the rod 48 for vertical adjustment, relative to the bearings 46, 46, under the control of the lever 52. Intermediate its ends, the shaft 45 is formed with spline teeth 54 cooperatively received within the gear 38, whereby the shaft 36 is drivingly connected to the shaft 45 regardless of the position of vertical adjustment of the shaft 45, within its range.

Journalled in the shaft 45, coaxial therewith, and projecting from both ends thereof, is a second shaft 55, the upper end of which is provided with spline teeth 56 cooperatively received within the gear 44, whereby the shaft 42 is connected to drive the shaft 55.

An auxiliary frame or housing 57 is bolted to the lower end of the tubular shaft 45 and projects perpendicularly radially therefrom. A shaft 58 is journalled in said auxiliary frame, the axis of said shaft being disposed in the plane of the axis of the shaft 55, and perpendicularly related to said axis. A beveled gear 59 on the lower end of the shaft 55 meshes with a beveled gear 60 on the shaft 58; and, adjacent the other end of said shaft 58, a beveled gear 61 is carried on such shaft and may be selectively positioned at any one of a plurality of points along the length of said shaft 58 defined by a series of transverse bores 62 in said shaft.

A plate 63 is adjustably hung from the bottom plate of the auxiliary frame 57 by means of a plurality of bolts 64. Said bottom plate of the frame 57 is bored at a plurality of points for the reception of such bolts in any one of a plurality of positions of adjustment differently spaced from the axis of the shaft 55, so that the scarifying means supported from the plate 63 may be adjustably positioned with reference to the plant or hill to be cultivated. The plate 63 is further formed with curved slots 65 with which said bolts 64 cooperate, so that said plate may be adjusted, about the axis of a bore 66 therein, to vary the angular relation of said plate with a line radial with respect to the shaft 55. Thus, in the position of Fig. 6, the plate 63 has its median longitudinal line coincident with a radius extending from the axis of the shaft 55; while, in the position of Fig. 7, that median line is angularly related to a radius, the inner end of the plate 63 having been shifted forwardly, and the outer end having been shifted rearwardly, with respect to such radial line. The result of such an adjustment, of course, will be to throw dirt inwardly toward the plant or hill being cultivated.

The bore 66 acts as one bearing for a shaft 67, the other bearing of which may be provided by a bracket 68 supported upon a bearing plate 69 depending from the plate 63. A second bearing plate 70, likewise dependent from the plate 63, cooperates with the plate 69 to provide a journal mounting for a shaft 71 carrying a plurality of axially spaced discs 72 to any one or more of which may be selectively connected one or more cultivator blades 73. As is indicated in Fig. 1, I prefer to mount four such blades on each disc 72, each of said blades carrying an inwardly directed wing 73' which, during operation of the machine, tends to throw the dirt inwardly. A beveled gear 74 on the upper end of the shaft 67 meshes with the gear 61, while a beveled gear 75 at the lower end of the shaft meshes with a beveled gear 76 carried on the rotor 71. As is clearly to be seen in Fig. 3, the axis of the rotor 71 is substantially horizontal. The bottom plate of the frame 57 is slotted to accommodate the shaft 67 during adjustment of the plate 63 radially with respect to the shaft 55, and it will be seen that the bores 62 permit adjustment of the position of the gear 61 in accordance with such adjustment of the plate 63. The adjustment of the plate 63 illustrated in Figs. 6 and 7 is accomplished without disturbing the relationship of the gears 61 and 74, because that adjustment is made about the axis of the shaft 67.

When the machine is in operation, the blades 73 tend to throw earth; and therefore I prefer to provide a guard means in association with the rotor. As shown, the bearing plate 70 supports a curved guide strip 77 which projects forwardly and downwardly from said plate, while the plate 69 supports a similar strip (not shown). Upon the peripheral edges of said guide strips is supported a cover sheet 78.

A further strip 79 is provided, adjacent its upper end, with a pair of slots 80 and 80' through which pass clamping bolts 81 and 81', into the plate 70, said strip 79 curving downwardly and rearwardly, as is clearly to be seen in Fig. 4. A similar strip (not shown) is similarly adjustably associated with the plate 69. A guard sheet 82 has its lateral edges secured to said two adjustable strips, and is movable therewith. Preferably, a spacer strap 82' extends between the lower ends of said adjustable strips; and preferably said strap will conform to a notch 115' formed in the outer lower edge of the sheet 82. The provision of the slots 80 and 80' permits adjustment of the sheet 82 and its associated parts about the axis of the rotor 71. Further, because of the exaggerated width of the slot 80, those parts may be adjusted slightly about the axis of the bolt 81'. Of course, the bolts 81 and 81' may be tightened to hold the parts firmly in any selected position of adjustment.

For the purpose of controlling the shape of the pile of earth formed about the axis of rotation of the described mechanism, I prefer to provide means defining an adjustable lower edge at that end of the guard nearest the axis of the shaft 55. Thus a link 85, formed with a slot 86 in one end thereof, is pivoted at 87 to a plate 89. A strip 88 has one end pivoted at 87 and its opposite end guided through the medium of a slot 90 in said plate 89 and a bolt 91 passing through said slot. A plate 92 is formed at its opposite ends with slots 93 and 94 receiving, respectively, the bolts 91 and 95, said bolt 95 being guided in a slot 96 in the plate 89 and passing also through an opening in one end of a link 97 whose opposite end is pivoted at 98 to the plate 89. Still another strip 99 has one end pivoted at 98 and its opposite end provided with a slot 100, a bolt 101 passing through the slots 86 and 100 and into the plate 70. A further slot 102 in the plate 89 accommodates a bolt 102' passing through an opening intermediate the ends of the link 99.

The above-described mechanism provides for adjustment of the strip 79 and the parts attached thereto about the axis of the rotor 71; adjustment of the links 88 and 97 to vary the effective contour of the lower edge of the plate 89; and adjustment of the plate 92 to vary the position of the conical surface of the hill which will be formed by operation of the machine. The last adjustment is usually desirable in connection with adjustment of the plate 63 about the axis of the shaft 67.

An abutment element 103 (Figs. 1 and 2) moves with the auxiliary frame 57. A lever 104, suitably pivoted at 105 on the frame 10, cooperates with a finger 106 on the shaft 25 in such fashion that, when the lever 23 is swung in a clockwise direction as viewed in Fig. 1, the notched end 107 of the lever 104 will engage said finger 106 to hold the shaft 25 against retrograde movement. Said lever 104 is provided at its opposite end with a cammed nose 108 cooperable with the abutment 103 in a manner later to appear; and a spring 109 urges said lever 104 to swing in a counterclockwise direction as viewed in Fig. 2.

Preferably, a lever 110, cooperable with a standard retention rack 111, will be connected, by a cable 112, to control an arm 113 upon which is mounted an idler roller 114 operable to tension the belt 28 so that, when the machine is being driven to or from a field in which it is to be used, the belt 28 may be slacked off to discontinue all drives except the traction drive.

If desired, the bearing plates 69 and 70 and all associated parts may be removed from the machine, and a frame work 116, carrying scarifying teeth 117, may be attached to the plate 63 in substitution therefor.

In operation, and assuming that the belt 28 is tensioned, operation of the engine 11, with the parts in the positions illustrated, will drive the traction wheels 14 through the clutch 17. By proper manipulation of the steering mechanism 13, the operator will bring the machine to a point at which the common axis of the shafts 45 and 55 will be located directly above a plant to be cultivated, and will then swing the upper end of the lever 23 forwardly. Through the cables 26 and 40, the clutch 17 will thereby be disengaged, to stop tractive motion of the machine, and the clutch 33 will be engaged to establish a driving connection between the prime mover and the shaft 36. Meantime, the shaft 42 is being driven by the belt 41 to rotate the rotor 71; and it will be assumed that the lever 52 has been properly adjusted to locate the blades 73 at the proper sub-surface level. When the shaft 36 begins to drive, the tubular shaft 45 will be rotated, carrying with it the frame 57 and the rotor 71, together with all their associated parts. Since the rotor 71 is located entirely outside the axis of the shaft 45, the blades 73 will travel around the plant or hill over which the shaft 45 has been centered.

Figure 2:
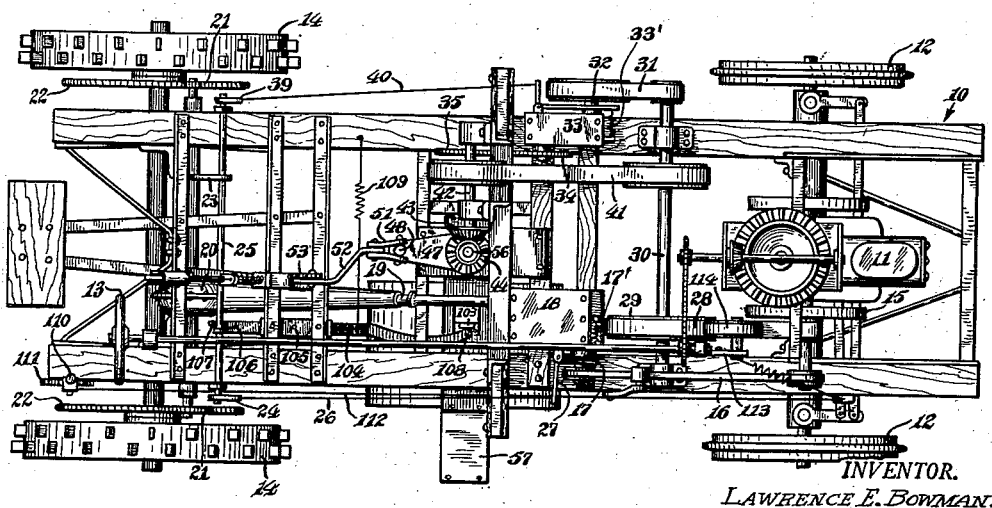
Fig. 2 is a top plan view thereof.
Figures 8, 9:
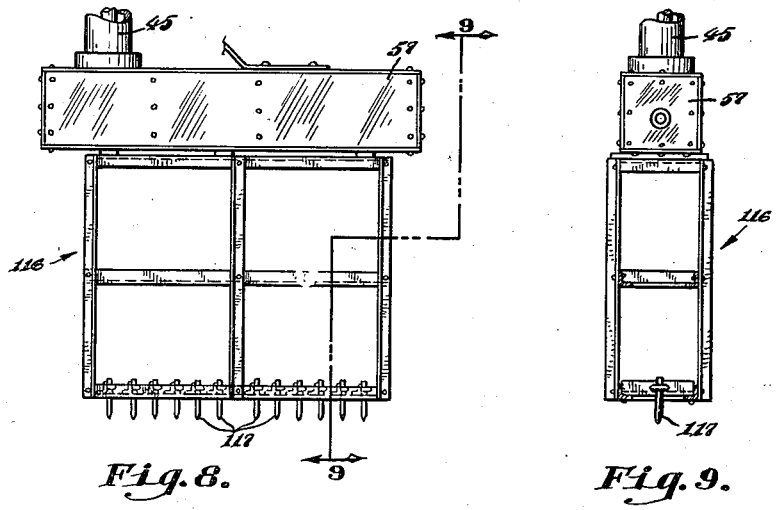
Fig. 8 is a rear elevation of a fragment of the machine showing a modified form of scarifying means.
Fig. 9 is a partial section taken substantially on the line 9—9 of Fig. 8.

As the frame 57 begins to rotate (moving in a counter-clockwise direction as viewed in Fig. 2) the abutment 103 will leave the nose 108 of the lever 104, permitting the spring 109 to shift the notched end 107 of said lever downwardly as viewed in Fig. 2 to engage in front of the finger 106 (see Fig. 1) to hold the lever 23 in the position to which it has been moved by the operator. As the frame 57 completes its revolution, the abutment 103 will engage behind the nose 108 of the lever 104 to shift the same downwardly as viewed in Fig. 2, thereby disengaging the notched end 107 of said lever from the finger 106; whereupon the standard springs associated with the clutch mechanisms 17 and 33 will act to return the lever 23 to its illustrated position, thereby disengaging the clutch 33 to stop rotation of the shaft 45, and reengaging the clutch 17 to initiate tractive movement of the machine.

Preferably, I will provide the sheet 82 with a notched lower corner, which may be closed, when desired, by one or more removable plates 115.

I claim as my invention:

1. A cultivator comprising a main frame, a prime mover mounted on said frame, an auxiliary frame mounted on said main frame for rotation about a vertical axis, a rotor carried on said auxiliary frame upon a horizontal axis, cultivator blades carried on said rotor, a drive train operatively connecting said prime mover to drive said auxiliary frame, and an independent drive train connecting said prime mover to drive said rotor.

2. A cultivator comprising a main frame, a prime mover mounted on said frame, an auxiliary frame mounted on said main frame for rotation about a vertical axis, a rotor carried on said auxiliary frame upon a horizontal axis, cultivator blades carried on said rotor, means for vertically adjusting the position of said rotor, a drive train operatively connecting said prime mover to drive said auxiliary frame, and an independent drive train connecting said prime mover to drive said rotor.

3. A cultivator comprising a main frame, a prime mover mounted on said frame, a vertical tubular shaft, bearings carried by said frame and supporting said shaft for rotation about its own axis and for reciprocation in the line of said axis, an auxiliary frame supported from said tubular shaft to move therewith, a rotor carried on said auxiliary frame upon a horizontal axis, cultivator blades carried on said rotor, and means operatively connecting said prime mover to rotate said tubular shaft about its vertical axis and to rotate said rotor about its horizontal axis.

4. A cultivator comprising a main frame, a prime mover mounted on said frame, an auxiliary frame mounted on said main frame for rotation about a vertical axis, a rotor, means supporting said rotor from said auxiliary frame upon a horizontal axis, said last-named means being adjustable relative to said auxiliary frame to vary the angle of said horizontal axis relative to a radius from said vertical axis, cultivator blades carried on said rotor, and means operatively connecting said prime mover to drive said auxiliary frame and to drive said rotor.

5. A cultivator comprising a frame, a prime mover carried on said frame, a rotor supported on said frame for rotation upon a horizontal axis and for bodily revolution about a vertical axis, means connecting said prime mover to drive said rotor about both said axes, cultivator blades on said rotor, and a shield for said blades mounted for rotation with said rotor about said vertical axis and comprising a guard sheet radially spaced from said blades and substantially concentric with said horizontal axis to confine earth thrown radially by said blades, an end guard at that end of said rotor adjacent said vertical axis to confine earth thrown axially by said blades toward said vertical axis, and a plurality of relatively adjustable elements supported upon said end guard at the lower edge thereof, said elements being adjustable, relative to said end guard, to vary the effective shape and position of the effective lower edge of said end guard relative to the ground surface, thereby acting to control the effective shape and position of a hill of earth produced by rotation of said blades about said horizontal axis during revolution of said rotor about said vertical axis.

6. A cultivator comprising a main frame, a prime mover mounted on said frame, a rotor supported on said frame for rotation about a horizontal axis and for bodily revolution about a vertical axis, cultivator blades on said rotor, means connecting said prime mover to drive said rotor about said horizontal axis, and other means connecting said prime mover to drive said rotor about said vertical axis, said last-named means including a clutch, manually-manipulable means for engaging said clutch, and means including a shiftable element movable to disengage said clutch and an element mounted to move about said vertical axis with said rotor and cooperating with said shiftable element to move the same to disengage said clutch upon completion of one complete revolution of said rotor about said vertical axis.

7. A cultivator comprising a main frame, a prime mover mounted on said frame, a tubular shaft journalled on said main frame for rotation about its vertical axis, a second shaft coaxial with said tubular shaft, journalled within said tubular shaft for independent rotation relative thereto, and projecting therefrom at one end, an auxiliary frame fixed to said tubular shaft at the other end thereof and projecting substantially perpendicularly therefrom, a third shaft journalled in said auxiliary frame upon an axis substantially perpendicular to the axis of said second shaft, means providing a driving connection between said second and third shafts, a rotor, cultivator blades carried on said rotor, means suspending said rotor from said auxiliary frame for rotation about a horizontal axis, a fourth shaft, means providing a driving connection between said third and fourth shafts, means providing a driving connection between said fourth shaft and said rotor, means providing a driving connection between said prime mover and said tubular shaft, and means providing a driving connection between said prime mover and the projecting end of said second shaft.

8. A cultivator comprising a main frame, a prime mover mounted on said frame, a tubular shaft journalled on said main frame for rotation about its vertical axis, a second shaft coaxial with said tubular shaft, journalled within said tubular shaft for independent rotation relative thereto, and projecting therefrom at one end, an auxiliary frame fixed to said tubular shaft at the other end thereof and projecting substantially perpendicularly therefrom, a third shaft journalled in said auxiliary frame upon an axis substantially perpendicular to the axis of said second shaft, means providing a driving connection between said second and third shafts, a rotor, cultivator blades carried on said rotor, means suspending said rotor from said auxiliary frame for rotation about a horizontal axis, means providing a driving connection between said third shaft and said rotor, means providing a driving connection between said prime mover and said tubular shaft, and means providing a driving connection between said prime mover and the projecting end of said second shaft.

9. A cultivator comprising a main frame, a prime mover mounted on said frame, a gear supported on said frame for rotation about a vertical axis, a tubular shaft journalled on said frame, having a splined connection with said gear, and vertically reciprocable on said axis with respect to said gear, a drive train operatively connecting said prime mover with said gear, said drive train including a clutch, a second shaft journalled in said tubular shaft for reciprocation therewith and rotation relative thereto, coaxial with said tubular shaft and projecting through said tubular shaft from end to end thereof, a second gear splined on the upper projecting end of said second shaft and supported on said frame for rotation about said axis, a drive train operatively connecting said prime mover with said second gear, a rotor, cultivator blades carried by said rotor, means suspending said rotor from said tubular shaft, wholly outside said vertical axis, for rotation about a horizontal axis and to move with said tubular shaft, means providing a driving connection between said second shaft and said rotor, manually-manipulable means for engaging said clutch, and means for automatically disengaging said clutch when said tubular shaft reaches a predetermined position of rotation about said vertical axis, including a rotationally fixed clutch actuator and an element moving with said tubular shaft and engageable with said actuator when said tubular shaft reaches such position.

10. A cultivator comprising a main frame, a prime mover mounted on said frame, a gear supported on said frame for rotation about a vertical axis, a tubular shaft journalled on said frame, having a splined connection with said gear, and vertically reciprocable on said axis with respect to said gear, a drive train operatively connecting said prime mover with said gear, a second shaft journalled in said tubular shaft for reciprocation therewith and rotation relative thereto, coaxial with said tubular shaft and projecting through said tubular shaft from end to end thereof, a second gear splined on the upper projecting end of said second shaft and supported on said frame for rotation about said axis, a drive train operatively connecting said prime mover with said second gear, a rotor, cultivator blades carried by said rotor, means suspending said rotor from said tubular shaft, wholly outside said vertical axis, for rotation about a horizontal axis and to move with said tubular shaft, and means providing a driving connection between said second shaft and said rotor.

11. A cultivator comprising a main frame, ground wheels supporting said frame, a prime mover mounted on said frame, a drive train connecting said prime mover to drive said ground wheels and including a first clutch, a first shaft journalled on said frame for rotation about a vertical axis, a second shaft journalled on said frame, a rotor supported from said first shaft entirely outside the axis of said first shaft for rotation about a horizontal axis and to move with said first shaft, means operatively connecting said second shaft to drive said rotor about its horizontal axis, cultivator blades carried on said rotor, a drive train connecting said prime mover to drive said second shaft, a drive train connecting said prime mover to drive said first shaft and including a second clutch, manually-manipulable means operatively connected to said first and second clutches, and effective, when shifted in one direction, to disengage said first clutch and to engage said second clutch, an element mounted to move with said first shaft, and means disposed in the path of said element and engageable by said element, upon completion of one revolution of said first shaft, to effect engagement of said first clutch and disengagement of said second clutch.

12. A cultivator comprising a main frame, a prime mover mounted on said frame, an auxiliary frame mounted on said main frame for rotation about a vertical axis, earth scarifying means supported on said auxiliary frame wholly outside said vertical axis, and a drive train connecting said prime mover to drive said auxiliary frame about said axis, said drive train including a clutch, manually-manipulable means for engaging said clutch, an element moving with said auxiliary frame, and means disposed in the path of said element and engaged by said element upon completion of one complete revolution of said auxiliary frame about said vertical axis, to effect disengagement of said clutch.

13. A cultivator comprising a main frame, ground wheels supporting said frame, a prime mover mounted on said frame, a drive train connecting said prime mover to drive said ground wheels and including a first clutch, an element mounted on said frame for rotation about a substantially vertical axis, an auxiliary frame mounted on said element entirely outside said axis for bodily revolution about said axis, earth scarifying means supported on said auxiliary frame, a drive train including said element and connecting said prime mover to drive said auxiliary frame about said axis and including a second clutch, manually-manipulable means operatively connected to said first and second clutches, and effective, when shifted in one direction, to disengage said first clutch and to engage said second clutch, means biasing said manually-manipulable means against movement in said one direction, means mounted to move with said auxiliary frame, and a member mounted on said main frame and biased to engage said manually-manipulable means, when the latter has been shifted in said one direction, to retain the same against retrograde movement, said member having a portion disposed in the path of said last-named means and engageable by said last-named means, upon completion of one revolution of said auxiliary frame, to shift said member out of retaining engagement with said manually-manipulable means, whereby said first clutch will be engaged and said second clutch will be disengaged.

14. A cultivator comprising a frame, a prime mover carried on said frame, a rotor supported on said frame for rotation about a horizontal axis and for bodily revolution about a vertical axis, means connecting said prime mover to drive said rotor about both said axes, cultivator blades on said rotor, and a shield for said blades, mounted for rotation with said rotor about said vertical axis and comprising a guard radially spaced from said blades and substantially concentric with said horizontal axis to confine earth thrown radially by said blades, at least a portion of said guard being adjustable about said horizontal axis to vary the elevation of the lowermost edge of said guard, thereby varying the height of the hill of earth produced by rotation of said blades about said horizontal axis during revolution of said rotor about said vertical axis.

15. A cultivator comprising a frame, a prime mover carried on said frame, a rotor supported on said frame for rotation about a horizontal axis and for bodily revolution about a vertical axis, means connecting said prime mover to drive said rotor about both said axes, cultivator blades on said rotor, and a shield for said blades, mounted for rotation with said rotor about said vertical axis and comprising a guard radially spaced from said blades and substantially concentric with said horizontal axis to confine earth thrown radially by said blades, the lowermost edge of said guard, in a region remote from said vertical axis, being cut away to an elevation above the general level of said edge; and a plurality of plates selectively associable with said guard to fill, to varying degrees, such cut-away portion of such guard, thereby varying the effective area of such cut away portion, to vary the degree of confinement of earth loosened by rotation of said blades about said horizontal axis during revolution of said rotor about said vertical axis.

16. The combination of claim 4 in which said last-named means is further adjustable to vary the distance of said rotor from said vertical axis.

17. A cultivator comprising a main frame, a prime mover mounted on said frame, a tubular shaft journalled on said main frame for rotation about its vertical axis, a second shaft coaxial with said tubular shaft, journalled within said tubular shaft for independent rotation relative thereto, and projecting therefrom at one end, an auxiliary frame fixed to said tubular shaft, a third shaft journalled on said auxiliary frame upon an axis substantially perpendicular to the axis of said second shaft, means providing a driving connection between said second and third shafts, a rotor, cultivator blades carried on said rotor, means suspending said rotor from said auxiliary frame for rotation about a substantially horizontal axis, a fourth shaft journalled on said suspending means, meshing bevelled gears on said rotor and fourth shaft, a further bevelled gear on said fourth shaft, another bevelled gear on said third shaft adapted to mesh with said further bevelled gear, means for securing said last-named bevelled gear to said third shaft at any one of a plurality of positions along the length of said third shaft, and means for securing said suspending means to said auxiliary frame at any one of a plurality of positions differently spaced from said vertical axis and corresponding to the selective positions of said other bevelled gear.

LAWRENCE E. BOWMAN.

REFERENCES CITED

The following references are of record in the file of this patent:

UNITED STATES PATENTS

| Number | Name | Date |
|---|---|---|
| 2,370,777 | Clark | Mar. 6, 1945 |
| 2,410,508 | Lamme | Nov. 5, 1946 |
| 2,414,072 | Taft | Jan. 7, 1947 |
| 2,429,298 | Savage | Oct. 21, 1947 |

FOREIGN PATENTS

| Number | Country | Date |
|---|---|---|
| 455,765 | France | June 2, 1913 |
| 41,497 | Sweden | Oct. 25, 1916 |